United States Patent [19]

Ottesen et al.

[11] Patent Number: 5,369,533
[45] Date of Patent: Nov. 29, 1994

[54] DATA STORAGE DEVICE HAVING DIFFERENT STORAGE DENSITIES FOR DIFFERING TYPES OF DATA

[75] Inventors: Hal H. Ottesen; Gregory G. Floryance, both of Rochester, Minn.

[73] Assignee: International Business Machines Corporation, Armonk, N.Y.

[21] Appl. No.: 998,278

[22] Filed: Dec. 30, 1992

[51] Int. Cl.$^5$ ............................................. G11B 5/09
[52] U.S. Cl. .......................................... 360/51; 360/46
[58] Field of Search ................ 360/46, 51, 61, 65, 360/27, 53

[56] References Cited

U.S. PATENT DOCUMENTS

| | | | |
|---|---|---|---|
| 4,688,112 | 8/1987 | Shoji et al. | 360/61 |
| 4,799,112 | 1/1989 | Bremmer et al. | 360/51 |
| 4,809,088 | 2/1989 | Lofgren et al. | 360/51 |
| 5,087,992 | 2/1992 | Dahandeh et al. | 360/51 |
| 5,146,372 | 9/1992 | Cronch et al. | 360/51 |
| 5,278,703 | 1/1994 | Rub et al. | 360/51 |

*Primary Examiner*—Robert Limanek
*Assistant Examiner*—Minhloan Tran
*Attorney, Agent, or Firm*—Richard E. Billion; Roy W. Truelson

[57] ABSTRACT

In a storage device, such as a magnetic rigid disk drive, data is stored at varying linear densities in the user data storage portions to increase the effective storage capacity of the device as a function of the differences in soft error rate tolerance associated with the various types of data being stored and the ability of non-alphanumeric data to be enhanced by reconstruction or smoothing rather than by an error correction code. A data type signal included with incoming data dictates the recording frequency and a control signal associated with the recorded data block is read when data is addressed to appropriately adjust the clock frequency for reading such addressed stored data.

12 Claims, 3 Drawing Sheets

DATA STORAGE DEVICE HAVING DIFFERENT STORAGE DENSITIES FOR DIFFERING TYPES OF DATA

FIELD OF THE INVENTION

The present invention relates to data storage devices and more particularly to a formatting and control technique for enhancing the device storage density by selecting a linear density as a function of the type of data being stored.

BACKGROUND OF THE INVENTION

Disk drive data storage capabilities are being continuously enhanced by both the ability to store data more compactly at higher densities and by progressively lowering the cost per megabyte. Demand for storage continues to grow with the introduction of computer applications with more substantial storage requirements and can be expected to experience an acceleration of growth as cost effectiveness increases permit the use for further applications with high storage requirements.

Among the recording techniques used to enhance the utilization of the media storage surface, the most common is zone recording wherein data is stored in bands of concentric tracks with recording occurring at a constant frequency. The innermost track of a band or track with the smallest diameter is recorded at the maximum density and all other tracks on the surface or within the band are recorded at less than the optimum linear density. Zone recording allows a linear density defined by the innermost track of the band or zone which reduces the disparity between the recording density of the tracks and enhances the the usable storage capacity of the disk or the disk drive of which it is a part.

The zone recording may be further fine tuned by optimizing the frequency or recording density for each head disk interface with respect to each zone. Such a technique is shown in U.S. Pat. No. 5,087,992 wherein the frequency is set within each zone to the maximum error rate that does not exceed a selected value. Another approach is taught in U.S. Pat. No. 4,799,112 wherein the frequency is optimized for each track of the disk in accordance with the characteristics of the head disk interface. U.S. Pat. No. 4,604,748 teaches the recording of different types of data which have differing error tolerances. For that data which is more sensitive to errors, dual recording is used and also a higher level of error recovery is applied.

SUMMARY OF THE INVENTION

The numerous techniques for optimizing the recording density on a media surface, such as zone recording, optimizing the linear density of each individual track or optimizing density for each combination of head and media; do not address the further issue as to the error level that must be maintained with respect to the data being recorded. Alphanumeric data requires the most error free recording and usually being the most common data type, results in the storage device or system being limited to a common low error rate such as one error in $10^{12}$ bits or less. Other types of data such as images, video, speech or FAX can tolerate much higher error rates and can also use different recovery techniques. Thus to make the best use of a storage device or system, data should be recorded at the maximum density that the particular type of data tolerates while meeting the error rate standard for such data. Also the amount of data stored within a sector or other formatted unit will be a function of the type of error recovery used. While sophisticated and complex error correction codes (ECC) are used to identify and correct alphanumeric data errors, most other types of data can use reconstruction or smoothing techniques that are less complex and more suitable to the reproduction and use of a particular type of data.

There are numerous ways that can be selected to organize the storage of various data types. Data types can be stored in random fashion; various data types can be separated and stored in various zones or zone bit recording (ZBR) may be used in random or separated ways. Still other format modes or various combinations could be implemented on a specific disk drive to achieve the highest multimedia storage capability.

DETAILED DESCRIPTION

Figure 1A:
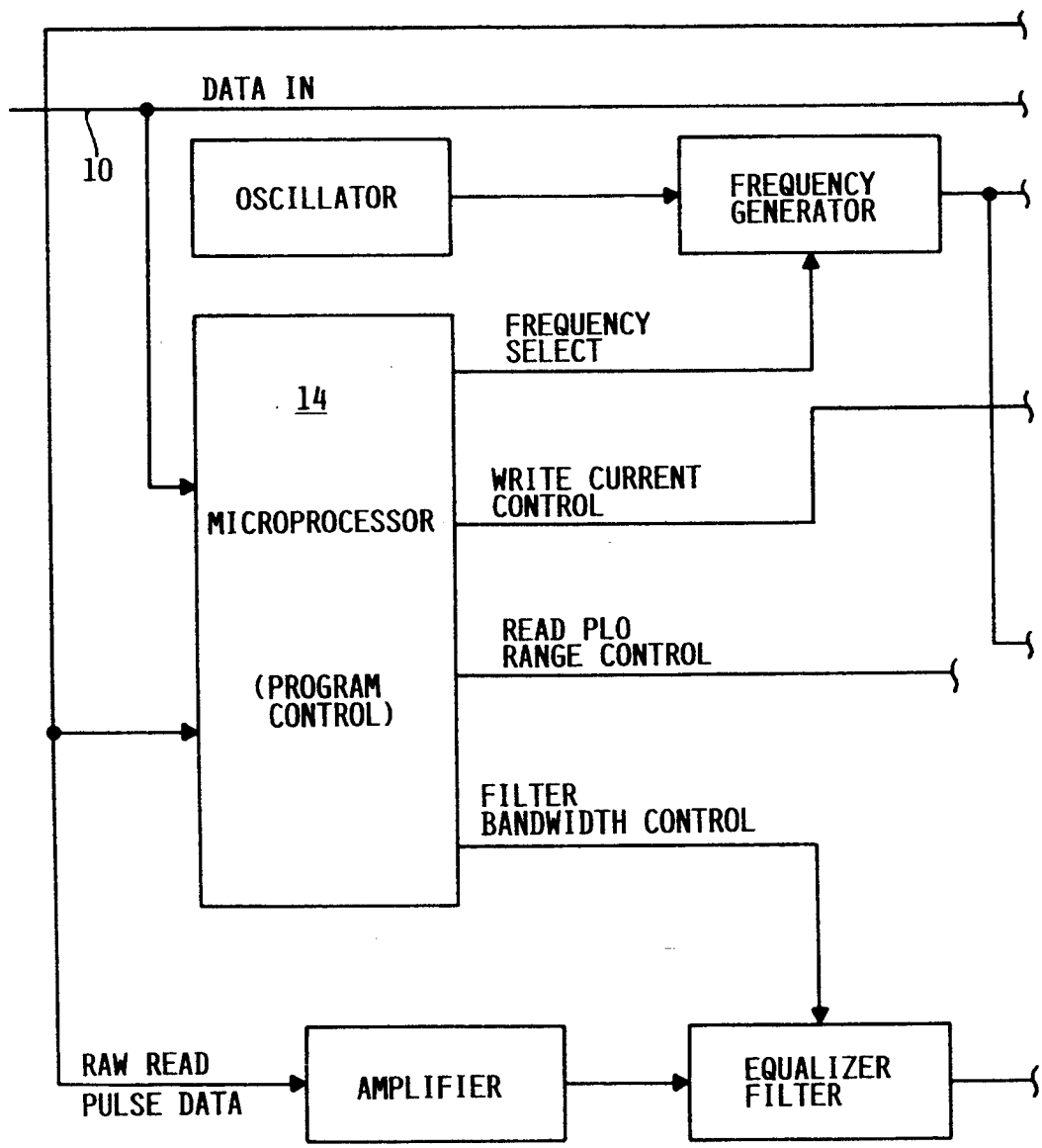
FIG. 1(*a*) and 1(*b*) are block diagram of a rigid disk drive control circuit illustrating use of the matched error rate function of the present invention.

Currently, all information stored on magnetic hard disk drives will satisfy some minimum soft error rate (SER) and hard error rate (HER) criteria. A common hard disk magnetic drive SER specification is $10^{-10}$ (errors/bit). In dealing with traditional data, such as alphanumeric characters and symbols, it is important to maintain such a low error rate. There is not the same requirement to store non-traditional data, compressed or uncompressed image or sound information, using the same low error rate, since any portion of the data that is degraded by error can be reconstructed by the use of techniques such as smoothing. The problem is that selectable SER criteria that can change the linear density at which data is stored in a hard disk drive.

Through long experience with magnetic recording it has been observed that there exists a "6% Rule". For every 6% linear density increase there is a corresponding increase in the soft error rate of roughly one decade. For example, if the linear density of a given rigid disk magnetic storage device was 50,000 bits/inch with an on track soft error rate of $10^{-14}$, then increasing the linear density by 12% to 56,000 bits/inch will yield an on-track soft error rate of approximately $10^{-12}$. Conversely, for each decade increase of soft error rate that can be tolerated by a class of data, the linear density at which the data is recorded may be increased 6%.

Consider next a hard disk drive with a fixed block architecture, e.g. 512 bytes of customer data per sector. For a constant spindle speed, the clock rate can be changed to increase the linear density in the data sector block to achieve the corresponding SER. The hypothetical example of Table 1, using the "6% rule", shows the corresponding capacity per fixed data block for a variable SER. The alphanumeric data also includes error correction codes (ECC) for recovering from errors. All non-alphanumeric data have more than 512 bytes per sector and are reconstructed using digital signal reconstruction techniques. Compressed data, for example data compressed by means of Discrete Cosine Transform (DCT) have the smoothing applied to the decompressed signal in frequency domain before the inverse DCT is performed. The smoothing (reconstruction) process will normally take place in the Input Output Processor (IOP) or host system. The data types other than alphanumeric which utilize reconstruction or smoothing techniques rather than an error correction code thus free up additional data storage capacity. Accordingly, the sector capacity becomes that shown in the table plus the additional capacity realized through the elimination of error correction codes.

TABLE 1

| Data Type | SER | Bytes/sector |
|---|---|---|
| Alphanumeric | $10^{-14}$ | 512 |
| Medical images | $10^{-10}$ | 635+ |
| Other images | $10^{-4}$ | 820+ |
| Video | $10^{-2}$ | 880+ |
| Speech | $10^{-2}$ | 880+ |
| FAX | $10^{-1}$ | 910+ |

If it is assumed that a disk drive has equal amounts of each of the data types listed in table 1, the capacity increase can exceed 50%. This is in addition to the enhancement resulting from data compression that is applied to the data before it is stored on the disk drive.

There are numerous ways to organize the storage of various data types. Data types can be stored in completely random fashion; various data types can be separated and stored in concentric zones or zone bit recording (ZBR) can be used in random or separated ways. Data could be stored as a function of the inherent SER of the head/disk interface. For thin film heads, for example, it is found that the signal to noise ratio is higher at the outer diameter than at the inner diameter. Thus the SER will be smaller at the outer diameter than at the inner diameter recommending that alphanumerics be stored at a higher linear density at the outer diameter and more error tolerant data such as FAX be stored at the inner diameter. Data could also be stored according to the inherent SER of the various heads. The head with the best (lowest) SER would handle mostly alphanumerics, while the poorest head would handle FAX.

In order to match acceptable data error rates with those offered by a device, certain interface changes and enhancements will be required. It is desirable that those interface modifications be minimal in order to limit the impact on the system microcode and therefore encourage acceptance and use of matched error rate devices. For illustrative purposes, the Small Computer Systems Interface (SCSI) will be used to highlight the interface requirements.

When a matched error rate device is installed on a system, it must be formatted to the usage requirements of that system. Device characteristics such as capacity and block size are determined at format time. Once formatted, both the device and operating system remember these characteristics and must, henceforth, operate within their limits. Therefore, during normal operation, a matched error rate device can not create capacity as a result of compression nor alter its block size to accommodate data with a different error rate criteria. At format time, a device could report its capacities for supporting different error rates and the resultant changes in device capacity. This might consist of a request to the device to calculate and return a capacity value for different error rates at a specific block size as specified by the host. Once the desired format for the device is determined, the host performs the format operation. SCSI already provides the Mode Sense command and Mode Select command "Format Device Page", for controlling format parameters. SCSI would require simple extensions to these commands to support matched error rate devices.

A process variable that must be controlled during device read operations is the amount and type of error recovery to be employed to recover a data error. The host may exercise error recovery control on a per command basis or it may span multiple commands to a single device. Devices typically define the various levels of recovery with the host able to select which level is used. Data recovery levels range in complexity and can include reread(s), offtrack reread(s), side track erasure followed by reread(s) and ECC application. On one extreme the host may disable error detection or allow a device to manufacture data when an error is detected. At the other extreme, the device may stop when an error is detected. SCSI supports the Mode Select command "Read Write Error Recovery Page" which specifies the level of data error recovery to be used. For matched error rate operation, a device would issue this command consistent with the desired level of error recovery needed.

A single device may support multiple error recovery procedure zones which may be associated with different signal to noise ratios across the diameter of the disk. In order to facilitate attachment to existing SCSI operating systems, the device could be subdivided into separate zones. The device would be addressed as a SCSI target with each zone addressable as a separate logical unit within that target. Each logical unit would have its unique format and error recovery parameters set by the Mode Select pages with values consistent with the type of data being stored on that logical unit. A SCSI device hides physical mapping of logical block locations from the host. Therefore, a device is free to map the zones as it chooses. This would allow physical zones to be defined on the basis of head characteristics, geometry, or even in a random fashion.

Figure 1B:
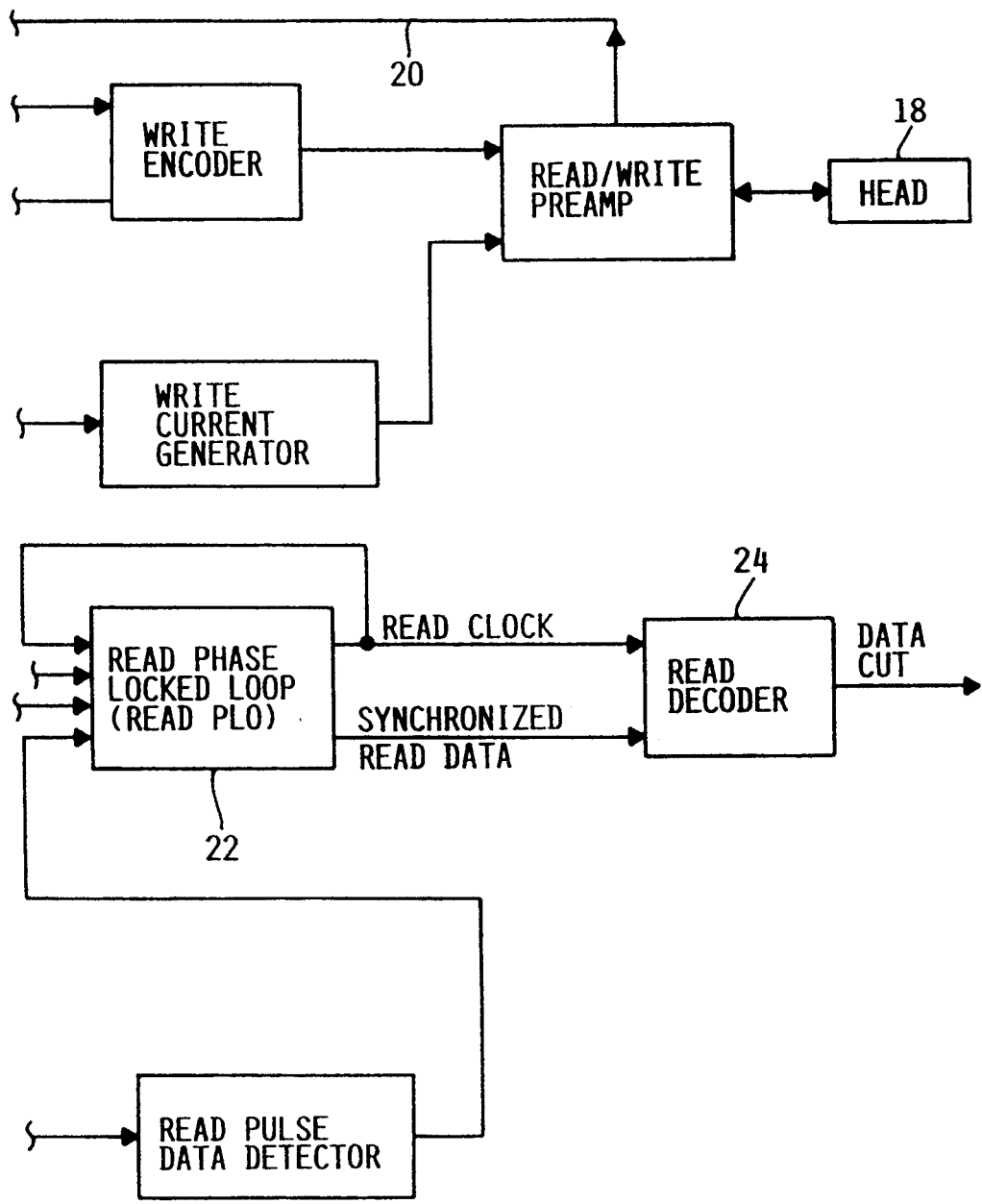

FIG. 1 is a block diagram illustrating the controller apparatus and circuitry used to effect device control including the matched error rate function of a device such as a rigid magnetic disk drive. The disk drive operates at a uniform angular velocity with the matched error rate function enabled by varying the linear density at which data is recorded. Although reference is made to linear density, the actual alteration to the data recording density is the variation of the recording frequency which is increased or decreased to respectively increase or decrease the amount of data stored in a fixed segment of a disk drive rotating at a constant rotational velocity or a fixed length of tape media moving at a constant linear velocity. The incoming data to be recorded or written to storage on line 10 is directed to write encoder 12 with control information including the data type being sensed by drive microprocessor 14. Within the drive, the data type may be included in the control information contained in the header portion of each sector or in a table which stores a data type or clock frequency associated with each sector data portion. The control functions exercised by microprocessor 14 over the writing and reading of data respectively to and from the media by the transducer head 18 includes the read/write frequency selection to match the read/write frequency with the linear recording density associated with and indicated by the data type signal sensed.

When a host system addresses data recorded on the media, the data stream read from the media on line 20 includes a data type signal or signal that enables the data type to be ascertained to thereby indicate the linear density and the clock speed required for reading the addressed data. This data type signal enables the microprocessor 14 to select the clock frequency for transmission to Read Phase Locked Loop 22 to synchronize read decoder 24.

Figure 2:
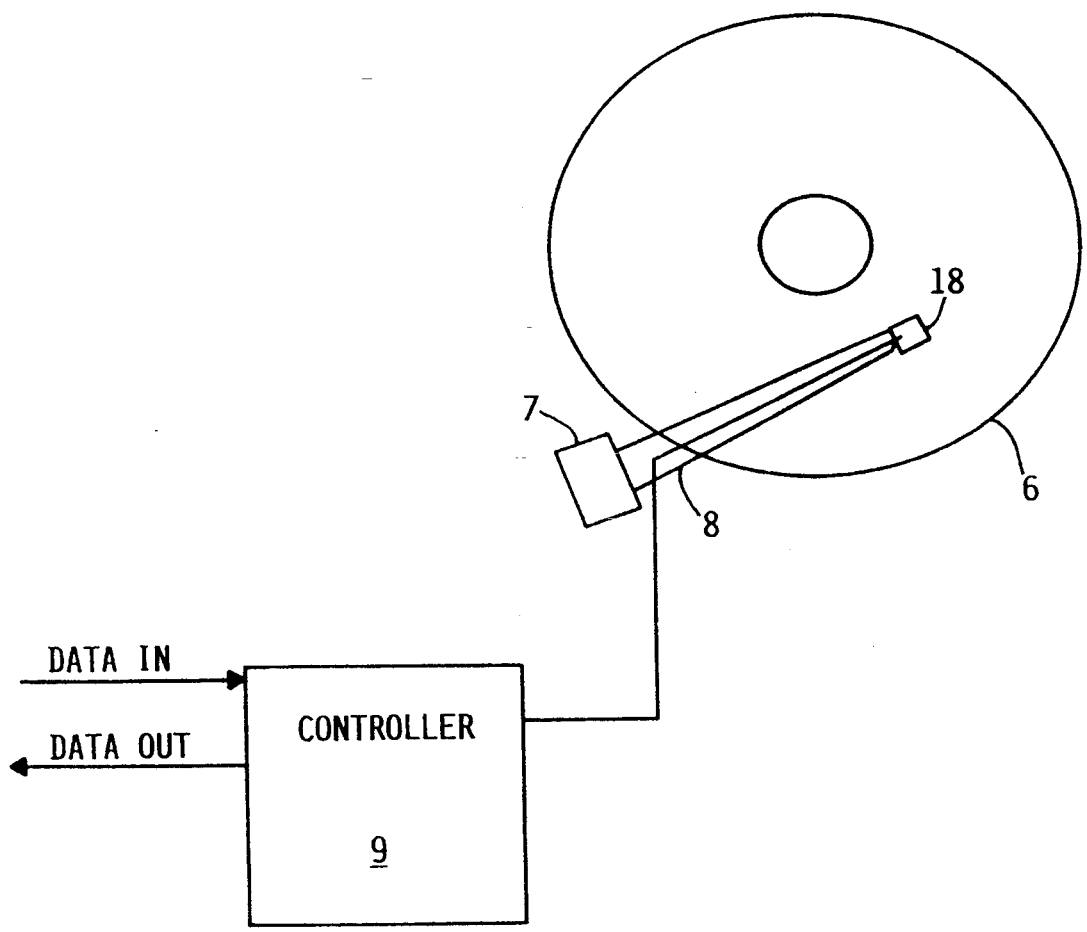
FIG. 2 is a schematic block diagram of portions of a rigid disk drive.

FIG. 2 is a schematic diagram of a rigid disk drive showing the disk storage media 6; an actuator 7 which supports and positions the suspension 8 and transducer head 18; and the controller 9 which is the subject of FIG. 1.

The storage technique including the matched error rate of the present invention may be used in large systems or networks where numerous storage devices or systems located in several widely separated locations, such as cities across the country, serve multitudes of host devices which in turn store and access every type and variety of data. Such a system would realize massive savings and reduced equipment size if the storage density was optimized for each user of the system in accordance with the required error tolerance. However, a system as small as a single microprocessor with storage capability would benefit from the matched error rate enhancement technique, whereby the storage capability is not held hostage to the restriction of the high error free recording associated with alphanumeric keyboard data.

While the invention has been particularly shown and described with reference to a preferred embodiment, it will be understood by those skilled in the art that various changes in form and details may be made therein without departing from the spirit and scope of the invention.

What is claimed is:

1. A data storage device which stores data serially along a track on a storage media comprising
   transducer means for writing data on and reading data from said storage media;
   read/write control logic means for sending data to and receiving data from said transducer means;
   said control logic means including means for reading and writing data at multiple, selectable recording frequencies at respectively varying linear densities in said track on said storage media, said control logic means further including:
   write frequency determination means for determining an appropriate recording frequency for data to be written received by said control logic means from at least one frequency indicator associated with said data; and
   read frequency signal determination means for determining an appropriate frequency for reading data recorded by said storage device.

2. The data storage device of claim 1 wherein said frequency indicator contained in said data is an indication of the type of data and said control logic means selects one of said multiple, selectable recording frequencies in response to the type of data indicated.

3. The data storage device of claim 2 wherein the data recorded on said media is in sequential data units and said read frequency signal determination means includes means for determining an appropriate frequency from a signal indicative of the recording frequency of stored data on said media within said data unit.

4. The data storage device of claim 3 wherein said storage device is a rigid magnetic disk storage device wherein data is stored on tracks in sectors which include a header sector portion and a data storage sector portion and said read frequency signal means comprises a frequency designating signal recorded in said sector header portion.

5. A method of writing data to a storage media of a storage device which operates at a substantially constant velocity during operation to provide matched error rate operation, wherein data is written to said storage media in discrete data records, and wherein a plurality of different types of data may be written to said storage media, each data record containing data of one of said plurality of different types, said method comprising the steps of:
   receiving a data record for recording on the storage media;
   sensing the type of data from an indicator associated with said data record being received for recording on the media;
   selecting a clock frequency for a write encoding device which determines a linear recording density as a function of the sensed data type;
   writing the data record being received to the recording media; and
   recording said data type in association with the data record being received.

6. The method of writing data to a storage media of claim 5 wherein said substantially constant velocity comprises rotating a rigid disk magnetic media at a constant rotational velocity.

7. The method of writing data to a storage media of claim 5 wherein the step of recording said data type comprises encoding in a header portion of a disk sector the frequency at which data is recorded in a subsequent data sector portion.

8. A method of reading data from a storage device including a storage media whereon data is recorded at varying linear densities as a function of the type data recorded comprising
   sensing information associated with an addressed data record to be read indicative of type of data and the linear density at which the data record is recorded on said media;
   selecting a clock frequency for reading the addressed data record which corresponds to the linear density at which said addressed data record is recorded: and
   transmitting said addressed data record to a host device requesting such addressed data record.

9. The method of reading data of claim 8 wherein said step of transmitting said addressed data record includes an identification of the data type.

10. The method of reading data of claim 9 wherein said storage device is a rigid disk drive with data stored in sectors on tracks disposed on the disk media and said information indicative of the linear density at which data is recorded is stored on an initial sector header portion and the data is stored in a subsequent data portion of said sectors whereby said sensing step is effected by reading the sector header portion.

11. A control apparatus for a recording device which stores data serially along a track on a recording medium, said control apparatus comprising:
   means for receiving data records for recording on said recording medium, each said data record containing data of a respective one of a plurality of different data types;
   frequency selection means for selecting a respective write frequency for each said data record from among a plurality of write frequencies supported by said control apparatus, said write frequency being dependent on the data type of the data contained in said data record;

means, responsive to said frequency selection means, for writing each said data record to said recording medium at said respective selected write frequency.

12. The control apparatus of claim 11, wherein said recording device is a rotating magnetic disk drive storage device.

* * * * *